UNITED STATES PATENT OFFICE.

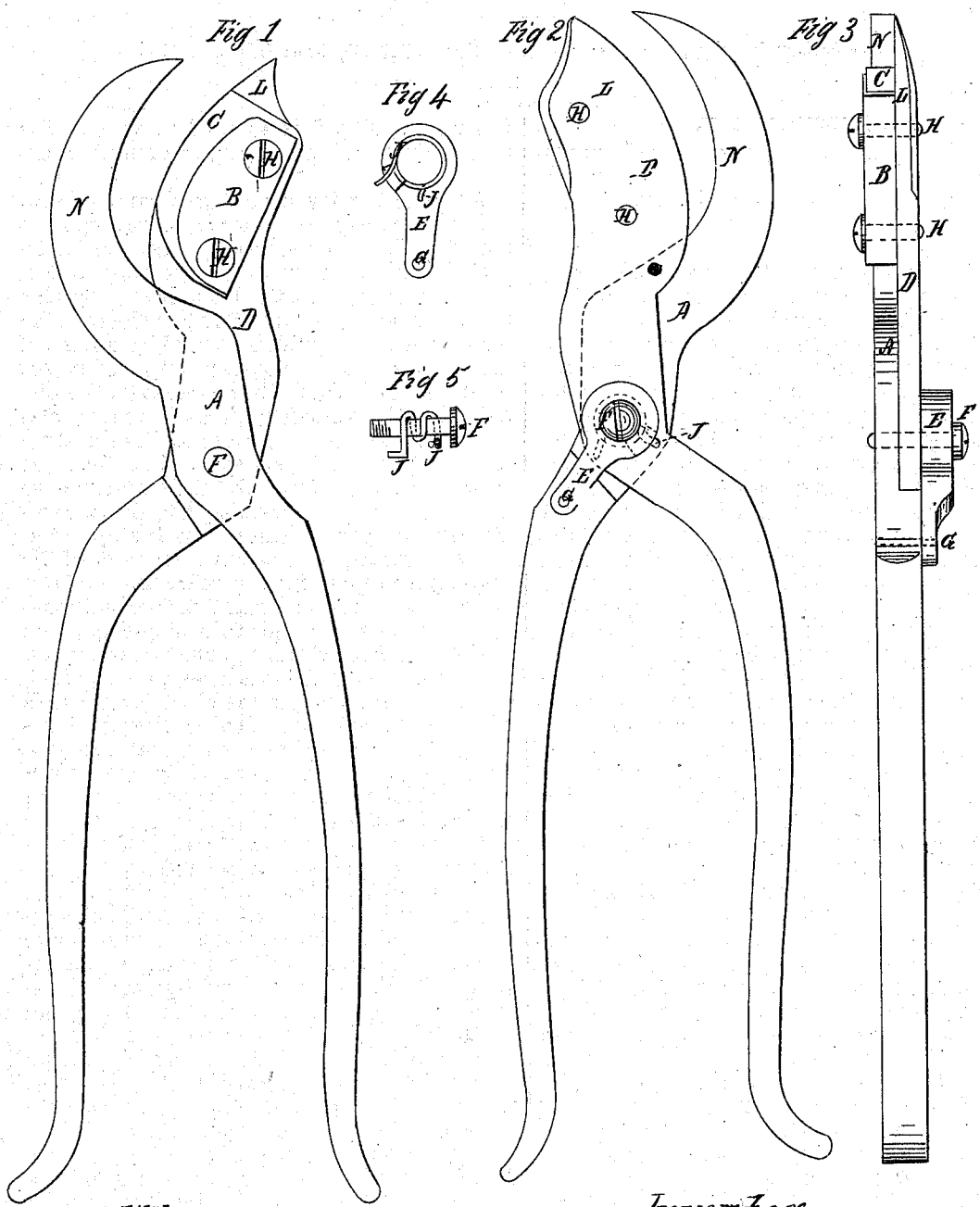

MANASSEH GROVER, OF CLYDE, OHIO.

IMPROVEMENT IN COMBINED PRUNING-SHEARS AND FRUIT-PICKERS.

Specification forming part of Letters Patent No. 129,946, dated July 30, 1872.

SPECIFICATION.

Specification describing certain Improvements in Combined Pruning-Shears and Fruit-Pickers, invented by MANASSEH GROVER, of Clyde, in the county of Sandusky and State of Ohio.

My invention relates to the combination of a stay-cap, coil-spring, screw-pivot, and jaw-lever in such a manner as to prevent the shears from opening too far and the cutting-blade from cutting into the jaw of the jaw-lever, and to keep the coil-spring in its proper position and also to a proper tension, and to render the shears more durable and not as liable to become deranged or out of order, and more conveniently used in consequence of the shears not being allowed to spring open too far. My invention also relates to an addition of a fruit-picker to the said pruning-shears and to be used as such when desired; and, when desired, it may be detached from the pruning-shears, and the pruning-shears used for pruning only; but the fruit-picker may be attached and detached at will. The fruit-picker is constructed by attaching to the blade of the blade-lever a piece of India rubber, one edge corresponding in form with the cutting-edge of the blade, and placed even with it, and extending back to the back edge of the said blade, and a sheet-plate of iron or any other suitable material, and nearly the same size of the India-rubber picker, is placed over the picker, and a portion of it bent down over the back edge, and the fruit-picker and the sheet-plate are attached to the cutting-blade (the India rubber against the face side) by means of two screws passing through them and screwing into the cutting-blade. The edge of the India-rubber picker when in use comes in contact with the edge of the jaw of the jaw-lever and presses tight onto the stem of the fruit, and, at the same time, the cutting of the blade severs the stem from the vine or branch, and the India-rubber picker at the same time holds the fruit.

Figure 1 is a side elevation of the pruning-shears, showing a part of my invention, hereinafter described. Fig. 2 is a side elevation of the opposite side of the same, showing another part of my invention, hereinafter described. Fig. 3 is an edge view of the shears shut. Fig. 4 is a detached bottom side view of the stay-cap and coil-spring, hereinafter described. Fig. 5 is a detached view of the screw-pivot and coil-spring, hereinafter described.

A is the jaw-lever, having a concave jaw. F is the screw-pivot, and passes through the stay-cap E, the coil-spring $j$, and the blade-lever D, as seen at cut, Fig. 5, thereby fastening the stay-cap onto the blade-lever, and also fastening the blade-lever to the jaw-lever in the manner of a pair of shears; and by means of the screw-pivot the stay-cap can be adjusted, when necessary, onto the blade-lever, thereby adjusting the blade-lever in such a manner as to prevent the cutting-blade L from cutting into the jaw of the jaw-lever. G is the rivet that fastens the rear end of the stay-cap onto the jaw-lever. $j$ is the coil-spring that throws the shears open at the will of the operator. The said spring is placed in the cavity of the stay-cap, as represented in cut, Fig. 4, and one end placed in a notch extending from said cavity toward the rear end of the stay-cap, which prevents it from vibrating, and the other end of the spring is bent down, as seen in cut, Fig. 5, and placed in a hole in the blade-lever, which prevents this end also from vibrating; and this end of the spring passes out of the cavity of the stay-cap through a notch of a proper length in the side of the stay-cap just far enough toward the forward end for a stop to stop the end of the coil-spring and to allow the shears to open a proper distance, and to have the coil-spring stand at a proper tension. C is a piece of India rubber, termed fruit-picker, made of suitable size and thickness, and the forward edge corresponding and is even with the cutting-edge of blade L, and the fruit-picker is fastened to the face side of the blade L by the sheet-plate B being placed onto the picker and the back edge bent over the back edge of the fruit-picker, as represented at B, Fig. 3, and the screws H H pass through the sheet-plate B and picker C and screw into the blade L.

When it becomes necessary to use the shears for pruning only, the fruit-picker may be detached from the blade L by means of the screws H H, and reattached and detached at will; and in picking fruit the side of the shears having the fruit-picker should be placed toward the fruit, and, in closing the fruit-picker on the edge of the concave jaw N, it holds the stem of the fruit, and, at the same time, the cutting-blade L severs the stem from the vine or branch and is conveyed away with the fruit-picker.

I make no claim as being the first inventor of coil-springs for opening shears; nor the first inventor of India rubber being used as a part in constructing fruit-pickers; but

I claim as my invention—

The combination of the blade-lever D and jaw-lever A, coil-spring j, stay-cap E, fruit picker C, sheet-plate B, and screw-pivot F, all constructed, arranged, and operating substantially as and for the purposes hereinbefore set forth.

MANASSEH GROVER.

Witnesses:
RUSSELL B. McPHERSON,
WM. H. REYNOLDS.